US012639145B2

(12) United States Patent
Ocher et al.

(10) Patent No.: US 12,639,145 B2
(45) Date of Patent: May 26, 2026

(54) RESILIENT POST-PROCESSING ARCHITECTURE FOR ABNORMAL PROCESS TERMINATION

(71) Applicant: SAP SE, Walldorf (DE)

(72) Inventors: Alexander Ocher, San Jose, CA (US); Sreenivasulu Gelle, San Ramon, CA (US); Maicon Trasel Loebens, Ivoti (BR)

(73) Assignee: SAP SE, Walldorf (DE)

( * ) Notice: Subject to any disclaimer, the term of this patent is extended or adjusted under 35 U.S.C. 154(b) by 238 days.

(21) Appl. No.: 18/115,462

(22) Filed: Feb. 28, 2023

(65) Prior Publication Data

US 2024/0211328 A1     Jun. 27, 2024

Related U.S. Application Data

(60) Provisional application No. 63/477,298, filed on Dec. 27, 2022, provisional application No. 63/476,425, filed on Dec. 21, 2022.

(51) Int. Cl.
*G06F 11/07*     (2006.01)
*G06F 12/02*     (2006.01)

(52) U.S. Cl.
CPC ...... *G06F 11/0721* (2013.01); *G06F 11/0793* (2013.01); *G06F 12/0253* (2013.01)

(58) Field of Classification Search
CPC .............. G06F 9/3861; G06F 11/0703; G06F 11/0706; G06F 11/0709; G06F 11/0715; G06F 11/0721; G06F 11/0793; G06F 11/30; G06F 11/3003; G06F 11/302; G06F 12/0253
See application file for complete search history.

(56) References Cited

U.S. PATENT DOCUMENTS

| | | | | |
|---|---|---|---|---|
| 5,446,901 A * | 8/1995 | Owicki | .............. | G06F 12/0253 |
| | | | | 719/310 |
| 6,477,612 B1 * | 11/2002 | Wang | ................. | G06F 12/1027 |
| | | | | 711/2 |
| 7,733,774 B1 * | 6/2010 | Sasidharan | .......... | H04L 69/163 |
| | | | | 709/224 |
| 2003/0126164 A1 * | 7/2003 | O'Connor | .......... | G06F 12/0253 |
| 2021/0365440 A1 * | 11/2021 | Pople | .................... | G06F 16/215 |

OTHER PUBLICATIONS

Seema et al., "Design and Implementation of Dual Port SRAM Memory Architecture using MOSFETs", International Conference on Smart Grids, Power and Advanced Control Engineering (ICSPACE), 2017, pp. 357-362.*

* cited by examiner

*Primary Examiner* — David J. Huisman
(74) *Attorney, Agent, or Firm* — Sterne, Kessler, Goldstein & Fox P.L.L.C.

(57)     ABSTRACT

Disclosed herein are system, method, and computer program product embodiments for efficient operation relinquishment of a process in a system. An embodiment involves creating a control record based on the process and stores it in a lock-capable storage. The control record contains unique process identification information and an instruction for closing an operation associated with the process. If the embodiment then determines that the process has terminated abnormally based on the control record, it can execute the instruction stored in the control record to close the operation. After the embodiment determines that the operation has closed successfully, it can modify or delete the control record in the lock-capable storage.

20 Claims, 8 Drawing Sheets

| Process ID 202 | Date-time stamp 204 | Process name 206 |
|---|---|---|
| 13467 | 20150411063785 | BROWSER |
| 2649 | 20150411063785 | TEXT PROCESSOR |
| 4496 | 20150411071131 | IMAGE PROCESSOR |
| 19778 | 20150411075644 | SYSTEM CLEANUP |
| 5932 | 20150411094627 | EMAIL PROCESSOR |

List of process identification information 200

FIG. 2A

| List of process identification information 210 | | |
| --- | --- | --- |
| Process ID 212 | Date-time stamp 214 | Process name 216 |
| 2649 | 20150411063785 | TEST PROCESSOR |
| 4496 | 20150411071131 | IMAGE PROCESSOR |
| 19778 | 20150411075644 | SYSTEM CLEANUP |
| 5932 | 20150411094627 | EMAIL PROCESSOR |
| 13467 | 20150411132568 | FILE ORGANIZER |

FIG. 2B

| Control record 230 | |
| --- | --- |
| Process identification information 232 | Instruction to close operations 234 |
| 201504110063785 | 1. identify remote system 222;<br>2. build a connection with remote system 222;<br>3. call the delete function in remote system 222;<br>4. read the return value from the delete function. |
| 13467 | |

FIG. 2D

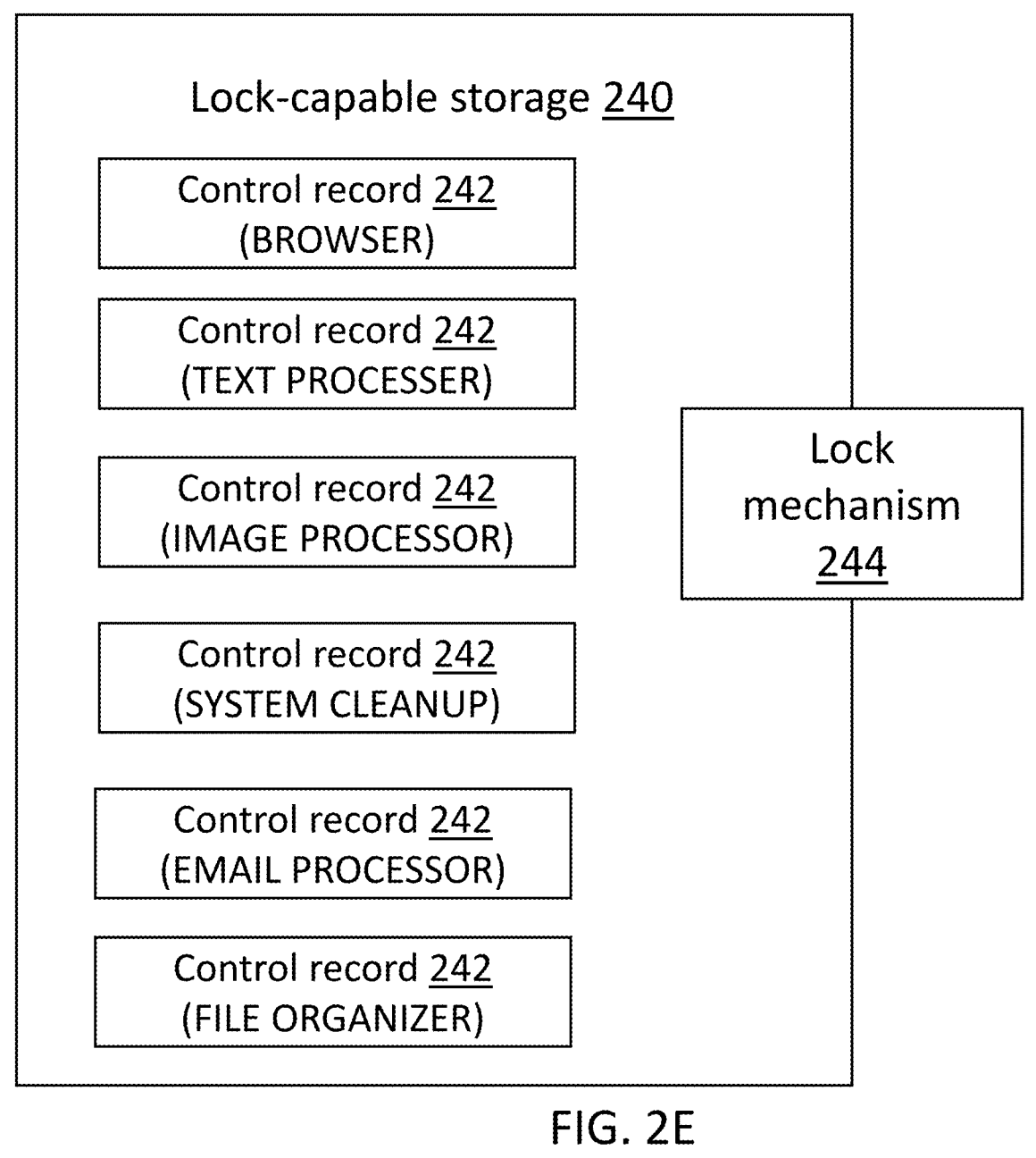

Lock-capable storage <u>240</u>

Control record <u>242</u>
(BROWSER)

Control record <u>242</u>
(TEXT PROCESSER)

Control record <u>242</u>
(IMAGE PROCESSOR)

Control record <u>242</u>
(SYSTEM CLEANUP)

Control record <u>242</u>
(EMAIL PROCESSOR)

Control record <u>242</u>
(FILE ORGANIZER)

Lock
mechanism
<u>244</u>

FIG. 2E

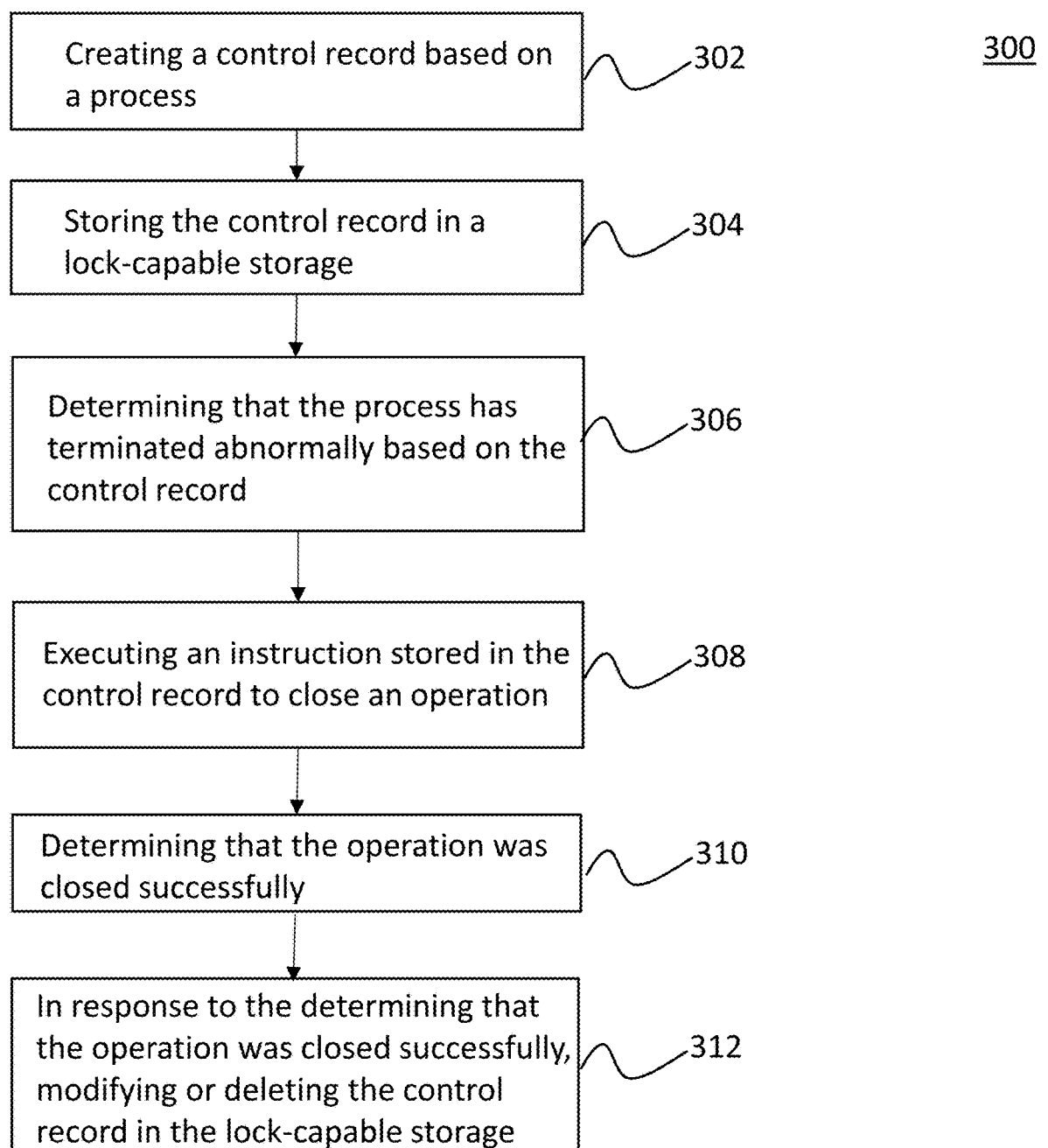

300

Creating a control record based on a process ⌇302

Storing the control record in a lock-capable storage ⌇304

Determining that the process has terminated abnormally based on the control record ⌇306

Executing an instruction stored in the control record to close an operation ⌇308

Determining that the operation was closed successfully ⌇310

In response to the determining that the operation was closed successfully, modifying or deleting the control record in the lock-capable storage ⌇312

FIG. 3

RESILIENT POST-PROCESSING ARCHITECTURE FOR ABNORMAL PROCESS TERMINATION

CROSS-REFERENCE TO RELATED APPLICATIONS

This application claims the benefit and priority to U.S. Provisional Patent Application No. 63/476,425, filed Dec. 21, 2022, entitled "Resilient Post-Processing Architecture for Daemonless Systems," and U.S. Provisional Patent Application No. 63/477,298, filed Dec. 27, 2022, entitled "Resilient Post-Processing Architecture for Daemonless Systems," all of which are incorporated herein by reference in their entireties.

BACKGROUND

A process may terminate abnormally in the middle of an operation. For example, this can happen when an access violation occurs, a segmentation fault occurs, or a terminate command is given. When this occurs, such operation may need to be explicitly closed; otherwise, the resources associated with the operation may not be released. For example, in the case of reading from another system, the read operation may need to be explicitly closed otherwise the resources associated with the operation in the source system (e.g., a table storage to store a result of a query) may not be released. The non-releasing of resources can often cause system inefficiency and delay. This is because it can take more time for other operations to find an available resource to use.

BRIEF DESCRIPTION OF THE DRAWINGS

The accompanying drawings are incorporated herein and form a part of the specification.

FIG. 2A is an example of a list of process identification information, according to some embodiments.

FIG. 2B is another example of a list of process identification information, according to some embodiments.

FIG. 2D is an example of a control record, according to some embodiments.

FIG. 2E is an example of a lock-capable storage, according to some embodiments.

FIG. 3 is a flowchart illustrating a process for efficient operation relinquishment, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for utilizing control records to efficiently relinquish one or more operations associated with a process. This solves the technological problem associated with relinquishing one or more operations associated with a process that terminated abnormally.

More specifically, when a process runs in a system, several operations associated with the process may be involved. The process may call operations in the same system. The process may also call operations outside the system. Some of the operations may use resources, for example, a memory, from a source system. When the process finishes normally, all operations associated with the process normally end, and all resources associated with the operations are normally released. However, when the process finishes abnormally, some operations associated with the process may not be completed successfully (e.g., some operations may end without releasing their associated resources). This causes various technological problems, including waste and delay. These technological problems can occur because some operations may need to search the whole source system to find certain data, and if some of the resources are occupied by non-functional operations, this may cause waste of time (e.g., delay) and energy.

In order to solve these technological problems, embodiments herein dynamically create a control record (e.g., in Extensible Markup Language (XML) format), with complete instructions on how to close an operation if the associated process (e.g., a software engine) ends abnormally (e.g., because of an access violation, segmentation fault, kill/terminate command, etc.) before finishing the operation. The control record can be written into lock-capable storage (e.g., a database, status file, individual process file, etc.). If the operation starts and ends normally, the control record can be deleted. However, if the operation starts and the process dies, the control record can stay in the system with the unique process identification of the process. A next process run (or a scheduled cleanup process) can read these control records and checks if the process that started it (e.g., identified by the process id) exists in the system. If it does, no action may be taken as the operation is still active. If it does not, the new process can perform the close operation as indicated in the control record and delete the record if the operation was closed successfully. The use of the locking mechanism can ensure that this close operation is performed only once.

Figure 1:
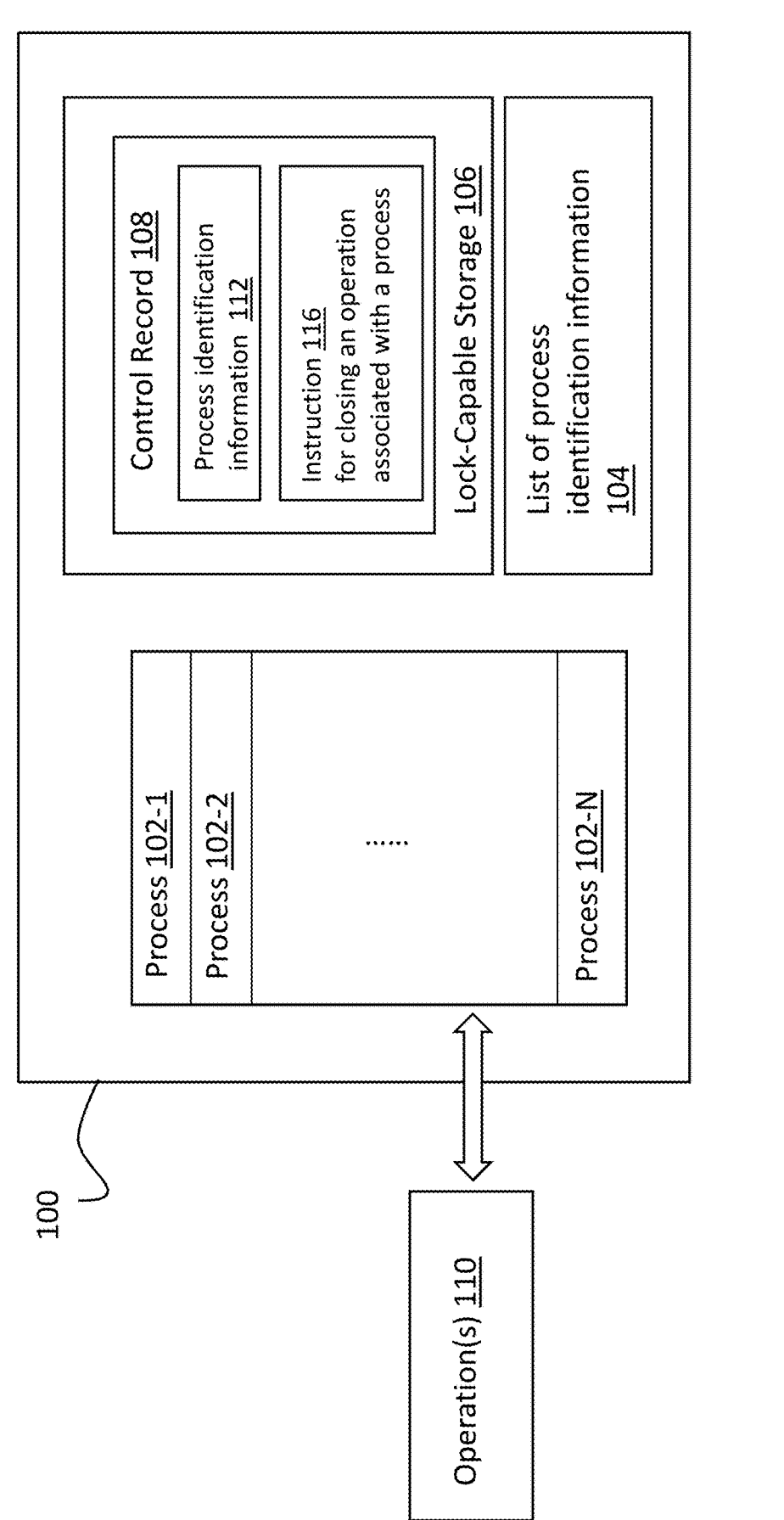
FIG. 1 is a block diagram of a system that includes efficient operation relinquishment, according to some embodiments.

FIG. 1 is a block diagram of a system 100 that includes efficient operation relinquishment, according to some embodiments. System 100 may be a server, cloud computing system, computer cluster, virtual machine, container, desktop computer, laptop, tablet, smartphone, or other device as would be appreciated by a person of ordinary skill in the art.

System 100 may include one or more processes 102-1 to 102-N. A process 102 may be any instance of a computer program that is currently being executed. More specifically, a process 102 may be an execution of a collection of instructions typically stored in a file on a permanent storage (e.g., a disk) after these instructions are loaded from a permanent storage into memory.

A process 102 may perform one or more operations 110. An operation 110 may be a sequence of program instructions that performs a specific task, packaged as a unit. An operation 110 may reserve one or more resources (e.g., a physical or virtual component of limited availability within a computer system).

A process 102 may have a unique process identification information 112. A process identification information 112 may have a number used to uniquely identify the associated process 102 (e.g., by an operating system kernel). A process identification information 112 may also include a date-time stamp which may represent the start time of the process 102.

System 100 may include a list of process identification information 104. A list of process identification information 104 may be a collective data that contains all process identification information in system 100.

System 100 may also include a lock-capable storage 106. A lock-capable storage 106 may be a storage device that is configured to allow only one process 102 access to the storage at one time.

A lock-capable storage 106 may store a control record 108. A control record 108 may be a record in XML format or another type of format as would be appreciated by a person of ordinary skill in art.

A control record 108 may contain a unique process identification information 112 and one or more instructions 116. An instruction 116 may contain instructions on how to close an operation (e.g., operation 110) if the associated process 102 ends abnormally (e.g., because of an access violation, segmentation fault, kill/terminate command, etc.) before finishing the operation. For example, an instruction 116 may include instructions for determining a source system type, opening a connection to a source system, determining a function to call, or determining a value of a function parameter. An instruction 116 may contain instructions on how to rollback an operation (e.g., operation 110) if the associated process 102 ends abnormally (e.g., because of an access violation, segmentation fault, kill/terminate command, etc.). An instruction 116 may be written in XML or another type of language as would be appreciated by a person of ordinary skill in art.

In order to solve the above technological problems, when a process 102 starts to run, system 100 may create a unique process identification information 112 for the process 102. System 100 may record the process identification information 112 in a list of process identification information 104. System 100 may also create a complete instruction 116 on how to close one or more operations 110 associated with process 102. System 100 may also create a complete instruction 116 on how to rollback one or more operations 110. System 100 may create a control record 108 with the process identification information 112 and the instruction 116. System 100 may store the control record 108 into a lock-capable storage 106.

When the process 102 finishes, normally or abnormally, system 100 may delete the process identification information 112 from the list of process identification information 104. Therefore, if a process identification information 112 that is associated with a process 102 is not existing in the list of process identification information 104, this process 102 may be considered to have finished (regardless of normality).

When the process 102 finishes normally, system 100 may delete the associated control record 108 from the lock-capable storage 106. Therefore, if a control record 108 that is associated with a process 102 exists in the lock-capable storage 106, it can mean either that the process 102 has not finished yet, or that the process 102 finished abnormally.

System 100 may determine whether the process 102 has finished abnormally and cleanup the residue of the process 102. This may be done by a second process 102. A second process 102 may be a second run of a previous process 102, or a different process 102 run by command. The second process 102 may also be a scheduled cleanup process 102 that runs automatically according to a schedule.

When system 100 determines whether a process 102 has finished abnormally by command or on schedule, it may access the lock-capable storage 106. If system 100 does not find a control record 108 existing in the lock-capable storage 106, it may determine that the previous process 102 has finished normally.

If system 100 finds a control record 108 existing in the lock-capable storage 106, it may read the process identification information 112 stored in the control record 108. System 100 may then search for an identical process identification information 112 in the list of process identification information 104.

If the list of process identification information 104 contains the exact same process identification information 112, system 100 may determine that the process 102 is still running. If the list of process identification information 104 does not contain a same process identification information 112, system 100 may determine that the process 102 has finished abnormally.

After determining that the process 102 has finished abnormally, system 100 may execute the instruction 116 stored in the control record 108. For example, system 100 may, according to the instruction 116, open a connection to a source system or call a cleanup function to close operations 110. System 100 may check, via a connection built as instructed in instruction 116, whether the operations 110 associated with the process 102 have been closed. If the operations 110 have not been closed, system 100 may continue to execute instruction 116. If the operations 110 have all been closed successfully, system 100 may delete the control record 108 from the lock-capable storage 106.

If multiple processes 102 can access the lock-capable storage 106 and execute the same instruction 116 in a control record 108, unnecessary computations may occur because extra computations may have been used for one single task. This may also cause error, for example, if a second process 102 cannot find the target operations 110 because they are being occupied and cleaned by another process 102. To avoid such unnecessary computations and error, the lock-capable storage 106 may reject all accesses from another process 102 when a process 102 is already reading and executing the instruction 116.

FIGS. 2A-2E are example block diagrams illustrating how system 100 may perform efficient operation relinquishment, according to some embodiments. FIGS. 2A-2E are described with reference to FIG. 1. However, FIGS. 2A-2E are not limited to that example embodiment.

In this example, system 100 is an operating system (e.g. UNIX, Microsoft Windows®, etc.), processes 102 that are running in the operating system include "BROWSER," "TEXT PROCESSOR," "IMAGE PROCESSOR," "SYSTEM CLEANUP," and "EMAIL PROCESSOR." "BROWSER" and "TEXT PROCESSOR" start at the exact same time, while other processes 102 start later at different time. Identification information of processes 102 may be shown in list of process identification information 104.

FIG. 2A shows an example list of process identification information 200 in a system that operates multiple processes, according to the above example. List of process identification information 200 may be an example of list of process identification information 104. List of process identification information 200 may be a process ID list in an operating system (e.g. UNIX, Microsoft Windows®, etc.).

In the example of FIG. 2A, list of process identification information 200 is a table with three columns: Process ID 202, Date-time stamp 204, and Process name 206. However, list of process identification information 200 may contain different information. List of process identification information 200 may contain different information. List of process identification information 200 be implemented using various other columns and data structures as would be appreciated by a person of ordinary skill in the art.

In the example of FIG. 2A, identification information of each process that is operating in the system is shown as a row in list of process identification information 200. The identification information of each process contains three pieces of information: a process ID 202, a date-time stamp 204, and a process name 206. A process ID 202 may be a number used by an operating system to uniquely identify an active process. A date-time stamp 204 may be a 14 digit data showing a start time of a certain process. A process name 206 may be the name of the process that is shown to the user.

In the example of FIG. 2A, there are five processes having their process identification information shown in list of process identification information 200. Each process ID 202 is different from each other, but date-time stamp 204 showing the start time of a certain process may be the same. For example, in FIG. 2A, both processes "BROWSER" and "TEXT PROCESSOR" have a same date-time stamp 204 as "20150411063785." It is because these two processes started at the exact same time. However, their process ID 202 are different. Therefore, even though multiple processes may start simultaneously, a process (e.g., process name 206) will still be located in list of process identification information 200 using the unique process ID 202.

While other processes 102 such as "TEXT PROCESSOR" may continue to run normally in system 100, a certain process 102, such as "BROWSER," may terminate abnormally. This may happen because a user manually terminates "BROWSER," or it may happen because "BROWSER" crashes. An additional process 102 may also start to run in system 100 after "BROWSER" has terminated.

FIG. 2B shows a later example list of process identification information 210 in a system that operates multiple processes, after process "BROWSER" has terminated, according to the above example. In this example, process "FILE ORGANIZER" starts to run after "BROWSER" has terminated. FIG. 2B shall be described with reference to FIG. 2A.

In the example of FIG. 2B, there are five processes having their process identification information shown in list of process identification information 210. The row of process identification information for process "BROWSER" in FIG. 2A has been deleted, and another row of process identification information for process "FILE ORGANIZER" has been added to list of process identification information 210. The process ID 202 for process "BROWSER" in FIG. 2A is "13467," and it is the same process ID 212 for process "FILE ORGANIZER" in FIG. 2B. However, the date-time stamp 204 and 214 for these two processes are different. Therefore, even though the process ID 212 may be reused after one process has terminated, together with the date-time stamp 214, a process (e.g., process name 216) can be located in list of process identification information 210.

Figure 2C:
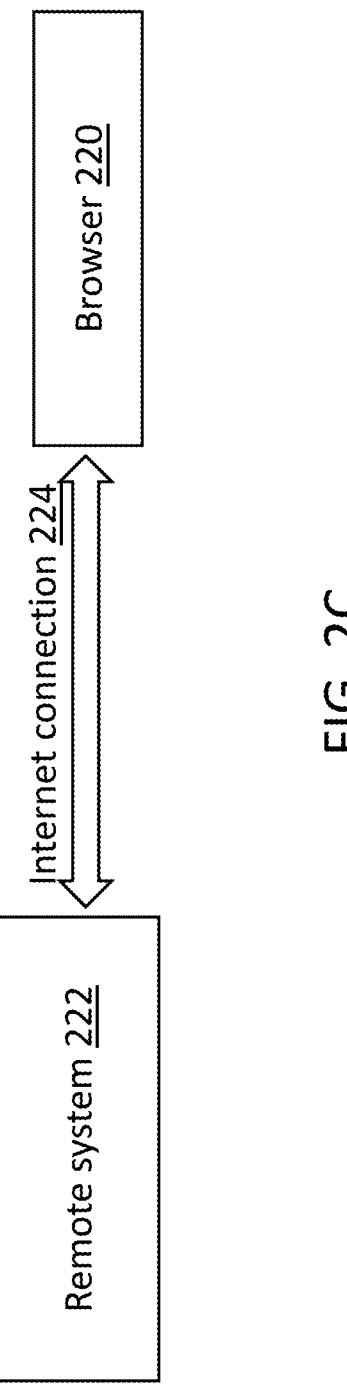
FIG. 2C is a block diagram illustrating a browser communicating with a remote system, according to some embodiments.

FIG. 2C further illustrates an example of browser 220 (e.g., the "BROWSER") communicating with a remote system 222, according to the above example. Browser 220 may be a type of process that allows users to access, retrieve and view information on the World Wide Web (e.g. Google Chrome, Mozilla Firefox, Apple Safari, Microsoft Edge, etc.). Remote system 222 may be a network of remote servers that are connected over the Internet and are used to store, manage, and process data. Browser 220 may communicate with remote system 222 via an Internet connection 224. Internet connection 224 may be a service that enables access to remote system 222. Internet connection 224 may be wired or wireless, and it may be established by cable line, LAN, cellular networks, satellite, or any other communication methods.

In the example of FIG. 2C, browser 220 may ask remote system 222 to do an online searching program. Normally, after receiving this request, remote system 222 may start the search and transmit the result back to browser 220 via Internet connection 224. However, if browser 220 suddenly crashes, for example because of an electric shut down, remote system 222 may not know that browser 220 has terminated. Remote system 222 may thus, continue to do the search and try to transmit the result back. Because browser 220 has terminated, Internet connection 224 will not exist anymore, so remote system 222 will not be able to transmit the result back, and consequently, the result will stay in remote system 222 and continue to occupy the memory storage in remote system 222.

FIG. 2D shows an example of a control record 230, according to the above example. FIG. 2D shall be described with reference to FIGS. 2A, 2B, and 2C.

In the example of FIG. 2D, control record 230 is created by "BROWSER" when "BROWSER" started to run in the operating system. Control record 230 may exist in lock-capable storage 106 until "BROWSER" deletes it during its normal termination. Control record 230 may also be deleted by other processes 102 if "BROWSER" terminates abnormally. In other words, the existence of control record 230 means either "BROWSER" is operating, or "BROWSER" has terminated abnormally and other processes 102 have not yet cleaned up for "BROWSER."

In the example of FIG. 2D, control record 230 may contain two pieces of information: process identification information 232, and instruction to close operations 234. Process identification information 232 may be a unique process identification information that includes a process ID and a date-time stamp. Instruction to close operation 234 may be a complete instruction of how to close an operation if the process performed it has ended abnormally.

In the example of FIG. 2D, process identification information 232 contains two numbers, in which "13467" is the process ID and "20150411063785" is the date-time stamp. In other words, there is a process having both the same process ID and the date-time stamp in list of process identification information 200, and the process name is "BROWSER." The successful matching of "BROWSER" means "BROWSER" is operating in system 100 at the time when list of process identification information 200 exists. In list of process identification information 210, however, there is a process with same process ID, and there is a process with same date-time stamp. However, there is no process listed in list of process identification information 210 that has both process ID and date-time stamp the same with process identification information 232. This unsuccessful matching can mean "BROWSER" has terminated, because no match can be found in list of process identification information 210, and "BROWSER" has terminated abnormally, because control record 230 still exists.

FIG. 2E shows an example of a lock-capable storage 240, according to the above example, at the time when list of process identification information 210 exists Lock-capable storage 240 may be a flash or solid-state memory drive that allows only one process to access. Lock-capable storage 240 may use a lock mechanism 244 to control the access to itself. Lock mechanism 244 may ensure that only one process can access lock-capable storage 240, avoiding race conditions and other synchronization issues. For example, lock mechanism 244 can be Mutex, Semaphore, Spinlock, or other similar mechanisms. FIG. 2E shall be described with reference to FIGS. 2B, 2C, and 2D.

In the example of FIG. 2E, six control records 242 are stored in lock-capable storage 240, and the list of process identification information 210 is as shown in FIG. 2B. For any process that terminates normally, the control record 242 associated with it may be deleted from lock-capable storage 240. Since control record 242 of process "BROWSER" exists in lock-capable storage 240, it did not end normally (e.g., still operating or terminated abnormally). A cleanup process, for example the "SYSTEM CLEANUP," may periodically access lock-capable storage 240 and search in list of process identification information 210 for each control record 242. Because list of process identification information 210 only lists active processes, if "SYSTEM CLEANUP" finds a match in list of process identification information 210 for a control record 242 (e.g., for "TEXT PROCESSER," "EMAIL PROCESSOR," etc.), it can mean the process that has generated the control record 242 is still operating. If "SYSTEM CLEANUP" cannot find a match in list of process identification information 210 for a control record 242 (e.g. for "BROWSER"), it can mean the process that has generated the control record 242 has terminated abnormally.

In the example of FIG. 2E, if "SYSTEM CLEANUP" determines that "BROWSER" has terminated abnormally, it can further read through control record 242 and execute instruction to close operations 234. In executing instruction to close operations 234, "SYSTEM CLEANUP" may identify remote system 222, build a connection with remote system 222, call the delete function in remote system 222, and read the return value from the delete function. When "SYSTEM CLEANUP" reads the return value and the value shows success of deletion, "SYSTEM CLEANUP" may delete control record 242 created by "BROWSER" from lock-capable storage 240.

In the example of FIG. 2E, if a user wants to cleanup background operations, the user may command any process to do so. For example, if the user requires "FILE ORGANIZER" to check and close any leftover operations, "FILE ORGANIZER" may access lock-capable storage 240 and search in list of process identification information 210 for each control record 242, just like what "SYSTEM CLEANUP" will do. However, if at a certain time, "SYSTEM CLEANUP" is reading instruction to close operations 234, and "FILE ORGANIZER" tries to access the same control record 230, lock mechanism 244 can deny "FILE ORGANIZER" from accessing it. Lock mechanism 244 may allow "FILE ORGANIZER" to access after "SYSTEM CLEANUP" has deleted control record 230.

FIG. 3 illustrates a flowchart for a method 300 for efficient operation relinquishment, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, system 100 creates a control record 108 based on a process 102. The created control record 108 may include a unique process identification information 112 associated with the process 102, and an instruction 116. An instruction 116 may contain instructions for closing an operation 110 associated with the process 102. The instruction 116 may contain at least one of determining a source system type, opening a connection to a source system, determining a function to call, or determining a value of a function parameter. An instruction 116 may contain instructions on how to rollback an operation 110.

In 304, system 100 stores the control record 108 in a lock-capable storage 106. The lock-capable storage 106 can prevent more than one process 102 from simultaneously accessing the lock-capable storage 106.

In 306, system 100 determines that the process 102 has terminated abnormally 100 based on the control record 108. System 100 may determine by a second process 102 running on demand. System 100 may also determine by a cleanup process 102 running according to a schedule. System 100 may also determine that the control record 108 exists in a lock-capable storage 106. System 100 may determine that the process 102 has terminated abnormally 100 when it determines that the process identification information 112 stored in the control record 108 is absent in the list of process identification information 104 in the system 100.

In 308, system 100 executes the instruction 116 stored in the control record 108 to close an operation 110 associated with the process 102.

In 310, system 100 determines that the operation 110 associated with the process 102 was closed successfully.

In 312, in response to system 100 determining that the operation 110 associated with the process 102 was closed successfully, system 100 modifies or deletes the control record 108 from the lock-capable storage 106. For example, system 100 may modify the control record 108 if the control record 108 is to be preserved for auditing purposes.

Figure 4:
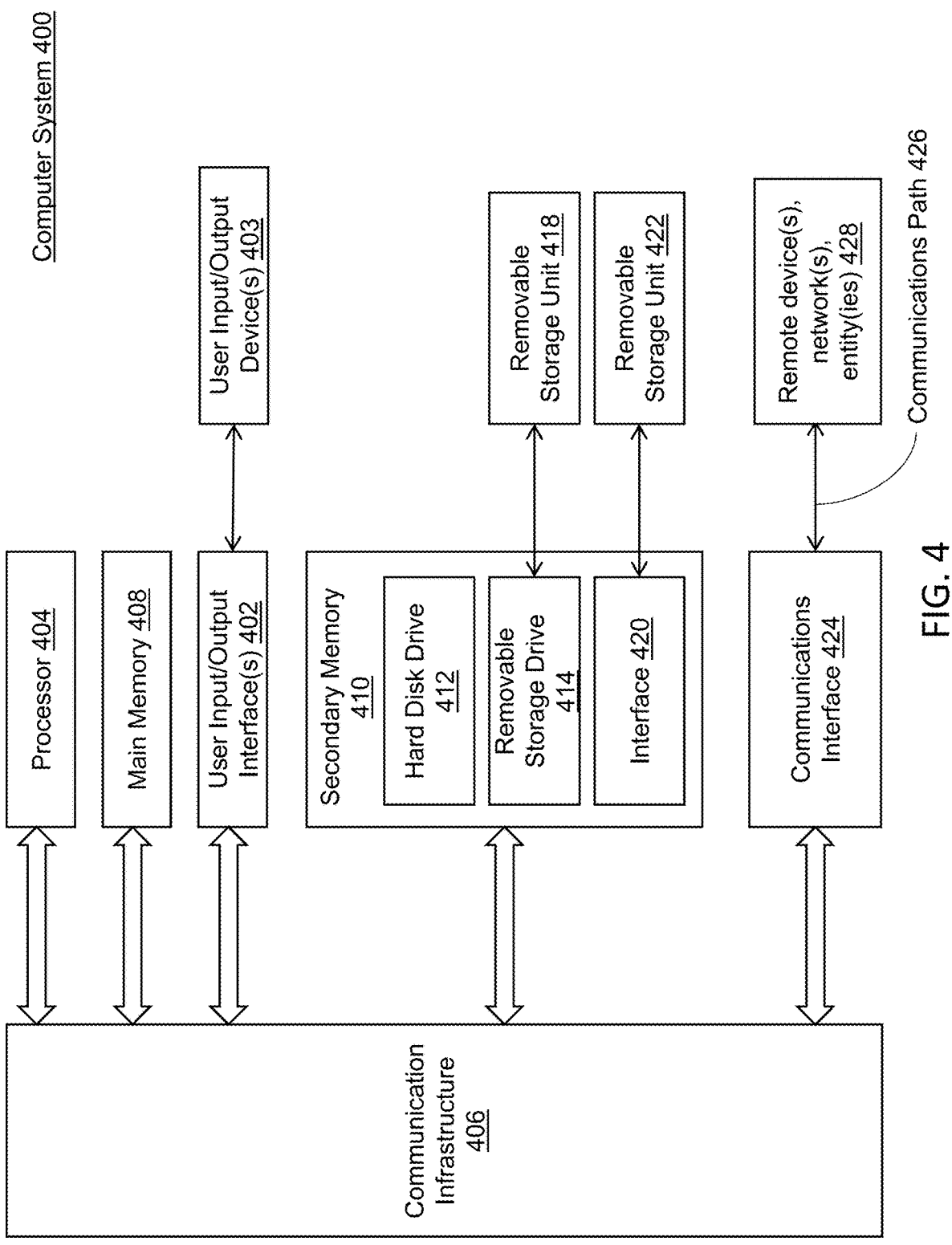
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for resource relinquishment of a first process in a system, the computer-implemented method comprising:

starting to run the first process;

creating a control record data structure specific to the first process in response to the first process starting to run, wherein the control record data structure comprises:

a unique process identification information for the first process, and an executable instruction for closing an operation performed by the first process;

storing the control record data structure in a storage configured to allow only one process access to the storage at one time;

determining that the first process has terminated abnormally based on the control record data structure;

executing the executable instruction of the control record data structure to close the operation;

determining that the operation was closed successfully; and in response to the determining that the operation was closed successfully, deleting the control record data structure in the storage.

2. The computer-implemented method of claim 1, wherein the executable instruction for closing the operation performs at least one of determining a source system type, opening a connection to a source system, determining a function to call, or determining a value of a function parameter.

3. The computer-implemented method of claim 1, wherein the determining that the first process has terminated abnormally comprises:

determining that the first process has terminated abnormally in response to an execution of another process.

4. The computer-implemented method of claim 1, wherein the determining that the first process has terminated abnormally comprises:

determining that the first process has terminated abnormally according to a schedule.

5. The computer-implemented method of claim 1, wherein the determining that the first process has terminated abnormally comprises:

determining that the unique process identification information of the control record data structure is absent in a list of process identification information in the system.

6. The computer-implemented method of claim 1, wherein the control record data structure comprises another executable instruction for rolling back the operation associated with the first process.

7. The computer-implemented method of claim 1, wherein the operation comprises a sequence of program instructions that perform a specific task, and the operation reserves one or more resources.

8. A system for resource relinquishment of a first process, comprising:

a memory; and at least one processor coupled to the memory and configured to:

create a control record data structure specific to the first process in response to the first process starting to run, wherein the control record data structure comprises:

a unique process identification information data structure, and an executable instruction for closing an operation performed by the first process;

store the control record data structure in a storage configured to allow only one process access to the storage at one time;

determine that the first process has terminated abnormally based on the control record data structure;

execute the executable instruction of the control record data structure to close the operation;

determine that the operation was closed successfully; and in response to determining that the operation was closed successfully, delete the control record data structure in the storage.

9. The system of claim 8, wherein the executable instruction for closing the operation performs at least one of determining a source system type, opening a connection to a source system, determining a function to call, or determining a value of a function parameter.

10. The system of claim 8, wherein to determine that the first process has terminated abnormally, the at least one processor is configured to:

determine that the first process has terminated abnormally in response to an execution of another process.

11. The system of claim 8, wherein to determine that the first process has terminated abnormally, the at least one processor is configured to:

determine that the first process has terminated abnormally according to a schedule.

12. The system of claim 8, wherein to determine that the first process has terminated abnormally, the at least one processor is configured to:

determine that the unique process identification information data structure of the control record data structure is absent in a list of process identification information in the system.

13. The system of claim 8, wherein the control record data structure comprises another executable instruction for rolling back the operation associated with the first process.

14. The system of claim 8, wherein the operation comprises a sequence of program instructions that perform a specific task, and the operation reserves one or more resources.

15. A non-transitory computer-readable medium having instructions stored thereon that, when executed by at least one computing circuit, cause the at least one computing circuit to perform operations comprising:

creating a control record data structure specific to a first process in response to the first process starting to run, wherein the control record data structure comprises:

a unique process identification information for the first process, and an executable instruction for closing a first operation performed by the first process;

storing the control record data structure in a storage configured to allow only one process access to the storage at one time;

determining that the first process has terminated abnormally based on the control record data structure;

executing the executable instruction of the control record data structure to close the first operation;

determining that the first operation was closed successfully; and in response to the determining that the first operation was closed successfully, deleting the control record data structure in the storage.

16. The non-transitory computer-readable medium of claim 15, wherein the executable instruction for closing the first operation performs at least one of determining a source system type, opening a connection to a source system, determining a function to call, or determining a value of a function parameter.

17. The non-transitory computer-readable medium of claim 15, wherein the determining that the first process has terminated abnormally comprises:

determining that the first process has terminated abnormally in response to an execution of another process.

18. The non-transitory computer-readable medium of claim 15, wherein the determining that the first process has terminated abnormally comprises:

determining that the first process has terminated abnormally according to a schedule.

19. The non-transitory computer-readable medium of claim 15, wherein the determining that the first process has terminated abnormally comprises:

determining that the unique process identification information of the control record data structure is absent in a list of process identification information associated with the at least one computing circuit.

20. The non-transitory computer-readable medium of claim 15, wherein the first operation comprises a sequence of program instructions that perform a specific task, and the first operation reserves one or more resources.

\* \* \* \* \*